(12) United States Patent
Pabst

(10) Patent No.: US 11,680,783 B2
(45) Date of Patent: Jun. 20, 2023

(54) LASER DETECTOR FOR FLEXIBLE MEASURING TOOLS

(71) Applicant: Thumbline, LLC, Oklahoma City, OK (US)

(72) Inventor: Robert Gage Pabst, Oklahoma City, OK (US)

(73) Assignee: Thumbline, LLC, Oklahoma City, OK (US)

( * ) Notice: Subject to any disclaimer, the term of this patent is extended or adjusted under 35 U.S.C. 154(b) by 0 days.

(21) Appl. No.: 17/711,818

(22) Filed: Apr. 1, 2022

(65) Prior Publication Data

US 2022/0316849 A1     Oct. 6, 2022

Related U.S. Application Data

(60) Provisional application No. 63/171,175, filed on Apr. 6, 2021.

(51) Int. Cl.
*G01B 3/10* (2020.01)
*G01B 3/1003* (2020.01)
*G01B 3/1089* (2020.01)
*G01B 3/1084* (2020.01)

(52) U.S. Cl.
CPC ......... *G01B 3/1003* (2020.01); *G01B 3/1089* (2020.01); *G01B 2003/1087* (2013.01)

(58) Field of Classification Search
CPC ........................... G01B 3/1094; G01B 3/1084
USPC ........................................................ 33/770
See application file for complete search history.

(56) References Cited

U.S. PATENT DOCUMENTS

| 1,713,891 | A | * | 5/1929 | Dooley | G01B 3/02 |
| | | | | | 24/114.5 |
| 4,580,347 | A | * | 4/1986 | McKnight | G01B 3/11 |
| | | | | | 24/3.12 |
| 4,642,899 | A | * | 2/1987 | Fass | G01B 3/1084 |
| | | | | | 33/763 |

(Continued)

FOREIGN PATENT DOCUMENTS

| CN | 204421787 | 6/2015 |
| KR | 20080093014 A | 9/2008 |
| WO | WO20201650598 A1 | 8/2020 |

OTHER PUBLICATIONS

Bosch LR8 Line Laser Receiver—Product Page, printed from Amazon.com, May 25, 2021, https://www.amazon.com/Bosch-LR8-Line-Laser-Receiver/dp/B07BDRFTQS/ref=sr_1_2?dchild=1&keywords=small+laser+receiver&qid=1608586418&sr=8-2.

(Continued)

*Primary Examiner* — George B Bennett
(74) *Attorney, Agent, or Firm* — Build IP, LLC; Robert V. Donahoe

(57) ABSTRACT

An apparatus is configured to employ with a retractable tape measure including a flexible measuring tape. The apparatus includes an electronic system including a laser receiver and a body configured to house the electronic system therein. The laser receiver is configured to detect a laser projected in at least one of a red wavelength and a green wavelength. The body includes an arcuate-shaped cavity configured to receive the flexible measuring tape in a sliding engagement, and a top surface oriented to face in a direction from which the flexible measuring tape is read with the flexible measuring tape received in the cavity. The top surface includes a port configured to align with the laser receiver.

18 Claims, 5 Drawing Sheets

(56) References Cited

U.S. PATENT DOCUMENTS

| | | | | |
|---|---|---|---|---|
| 5,894,675 | A * | 4/1999 | Cericola | G01B 3/1071 |
| | | | | 33/760 |
| 6,094,833 | A * | 8/2000 | Medley, Jr. | G01C 9/28 |
| | | | | 33/369 |
| 7,159,332 | B2 * | 1/2007 | Sullivan | G01B 3/1061 |
| | | | | 33/770 |
| 7,204,027 | B2 * | 4/2007 | Tacklind | G01C 15/004 |
| | | | | 33/291 |
| 7,353,619 | B2 * | 4/2008 | Gibbons | G01B 3/1084 |
| | | | | 33/759 |
| 7,444,759 | B1 * | 11/2008 | Fleming | G01B 3/1003 |
| | | | | 33/771 |
| 7,448,138 | B1 | 11/2008 | Vanneman | |
| 7,454,840 | B2 | 11/2008 | Delfini et al. | |
| 8,225,520 | B2 * | 7/2012 | Rabin | G01C 9/34 |
| | | | | 33/613 |
| 8,418,373 | B2 * | 4/2013 | Swanson | G01B 5/004 |
| | | | | 33/1 G |
| 8,522,447 | B1 | 9/2013 | Novotny | |
| 8,832,958 | B2 * | 9/2014 | Mabey | G01B 3/1005 |
| | | | | 33/758 |
| 9,046,340 | B2 * | 6/2015 | Li | G01S 17/88 |
| 9,188,418 | B2 | 11/2015 | Mamatkhan et al. | |
| 9,658,046 | B2 | 5/2017 | Fulton | |
| 9,816,795 | B2 | 11/2017 | Bitton et al. | |
| 9,879,995 | B2 * | 1/2018 | Dunne | G01C 15/002 |
| 10,132,606 | B2 * | 11/2018 | Scarborough | G01B 3/1056 |
| 10,197,373 | B2 | 2/2019 | DeMartinis et al. | |
| 10,456,879 | B2 * | 10/2019 | Cagle | G01B 5/0025 |
| 11,060,834 | B1 * | 7/2021 | Luck | G01B 3/1061 |
| 11,141,846 | B2 * | 10/2021 | Arbuckle | A47G 1/205 |
| 11,150,069 | B1 * | 10/2021 | Strong | G01C 9/36 |
| 11,226,199 | B2 * | 1/2022 | Unger | G01S 17/42 |
| 11,300,395 | B1 * | 4/2022 | Story | G01B 3/1071 |
| 11,486,704 | B2 * | 11/2022 | Hinderling | F16M 11/046 |
| 11,536,857 | B2 * | 12/2022 | Best | G01C 15/06 |
| 11,604,276 | B2 * | 3/2023 | Wang | G01S 7/4813 |
| 2006/0087641 | A1 | 4/2006 | Burkhart, Jr. | |
| 2011/0090481 | A1 | 4/2011 | Snyder | |
| 2012/0036727 | A1 | 2/2012 | Mccarthy | |
| 2015/0113821 | A1 | 4/2015 | Fulton | |
| 2017/0261301 | A1 * | 9/2017 | DeMartinis | G01B 3/1084 |

OTHER PUBLICATIONS

Dewalt Laser Detector, Green—Product Page, printed from Amazon.com, May 25, 2021, https://www.amazon.com/DEWALT-DW0892G-Laser-Detector-Green/dp/B0182AQQJS/ref=sr_1_5?dchild=1&keywords=small+laser+receiver&qid=1608586523&sr=8-5.

Dewalt Laser Detector For Rotary Lasers and Clamp—Product Page, printed from Amazon.com, May 25, 2021, https://www.amazon.com/DEWALT-DW0772-Digital-Laser-Detector/dp/B00006JSPZ/ref=sr_1_10?dchild=1&keywords=small+laser+receiver&qid=1608586558&sr=8-10.

Laser level, Multipurpose Laser Tape Measure Line 8ft+ Tape Measure Ruler Adjusted Standard and Metric Rulers Update Batteries MICMI—Product Page, printed from Amazon.com, May 25, 2021, https://www.amazon.com/Multipurpose-Adjusted-Standard-Batteries-MICMI/dp/B07PQT6VRK/ref=sr_1_11?dchild=1&keywords=level+bubble+tape+measure&qid=1608586580&sr=8-11.

Add an Inch Tool, Measuring tool for exact measurements in corners, accurate level marking and locks for repeated marks —Product Page, printed from Amazon.com, May 25, 2021, https://www.amazon.com/Measuring-measurements-corners-accurate-repeated/dp/B07D7ZXGG5.

Zip-Rip Tape Measure Attachment—Product Page, printed from Amazon.com, May 25, 2021, https://www.amazon.in/Zip-Rip-ZR1RD-Tape-Measure-Attachment/dp/B002Z8LPCC.

International Search Report and Written Opinion, dated Jul. 18, 2022, for corresponding International Application No. PCT/US22/23115.

* cited by examiner

LASER DETECTOR FOR FLEXIBLE MEASURING TOOLS

BACKGROUND OF INVENTION

1. Field of Invention

This invention relates generally to laser receivers. More specifically, at least one embodiment relates to a laser receiver configured for use with a flexible measuring tool.

2. Discussion of Related Art

Today, laser transmitters are a common tool used on jobsites both indoors and outdoors. The laser transmitter is located at a desired height to provide a fixed reference for elevation and/or level. For example, on indoor jobsites, a cross line laser is located at a temporary fixed location (for example, mounted on a tripod) and broadcasts a beam that illuminates walls, ceilings or floors depending on the orientation of the laser. With the laser level and directed in a horizontal direction, the illuminated beam provides a fixed and level horizontal elevation reference. With the laser plum and directed in a vertical direction, the illuminated beam provides a fixed perfectly vertical reference. The illuminated beam provides the reference by which plumbing, electrical, cabinetry and structural elements can be installed in a consistent manner at known relative locations on-site.

Rotary lasers are most often employed on large and/or outdoor jobsites. The rotary laser spins a laser beam 360 degrees about an axis of the laser. The rotary operation results in a laser beam that travels through each point about the rotational axis once during each complete revolution. This necessarily limits the visibility of the beam even when the beam is projected onto a surface. As a result, laser receivers (or "detectors") are employed in combination with rotary lasers. Typically, a user brings the laser receiver to the desired location within line-of-sight of a tripod mounted laser transmitter. For example, the user may wish to match the elevation of the laser at some distance from the laser (hundreds or thousands of feet away). The laser receiver includes a sensor in combination with an audible output to inform the user when the laser receiver is directly aligned with the beam. Most often the laser receiver is secured to a rigid surveying rod or stick and moved up and down by the user until the audible feedback indicates that the detector is properly aligned with the laser beam. The elevation reference provided by the laser beam can then be transferred to the user's location with a high degree of precision.

Flexible measuring tools such as retractable tape measures are ubiquitous tools employed in all manner of projects, by professionals and amateurs alike. In general, a face of a flexible tape is marked with measurement indicia. When not in use the tape is coiled around itself and stored within a housing. In use, the tape is withdrawn from the housing to make measurements using the measurement indicia for reference. A spring is also located within in the housing such that the tape is automatically retracted back into the housing by the force of the spring when the tape is released by the user.

Despite being handheld, rigid surveying sticks tend to be bulky items that are more difficult to use indoors and in tight spaces. Further, the size and weight of laser receivers used with surveying sticks or for other measurement applications make them impractical for use with a flexible measuring tool. In addition, current laser receivers are designed only to detect lasers projected at a single pulsing frequency.

SUMMARY OF INVENTION

Therefore, there is a need for apparatus, systems and methods to facilitate the use of a laser receiver in combination with a tape measure for precise measurements. Further, there is a need to easily operate the laser receiver in combination with a tape measure while in the field. There is also a need to allow a user to easily transport a laser receiver to a jobsite and around a jobsite.

According to one aspect, an apparatus is configured to employ with a retractable tape measure including a flexible measuring tape. The apparatus includes an electronic system including a laser receiver and a body configured to house the electronic system therein. The laser receiver is configured to detect a laser projected in at least one of a red wavelength and a green wavelength. The body includes an arcuate-shaped cavity configured to receive the flexible measuring tape in a sliding engagement, and a top surface oriented to face in a direction from which the flexible measuring tape is read with the flexible measuring tape received in the cavity. The top surface includes a port configured to align with the laser receiver.

According to another aspect, a method of employing a flexible measuring tape with a laser level is provided. In various embodiments, the flexible measuring tape includes a first edge and a second edge that is parallel to the first edge. The method includes providing an apparatus including a body and an electronic system having a laser receiver configured to detect a laser projected in at least one of a red wavelength and a green wavelength where the apparatus is provided in a handheld pocket-size form factor. The method further includes configuring the body to include each of: an arcuate-shaped cavity configured to receive the flexible measuring tape in a sliding engagement; a top surface oriented to face in a direction from which the flexible measuring tape is read with the flexible measuring tape received in the cavity; and a port formed in the top surface. According to some embodiments, the method includes locating the electronic apparatus within the body such that the laser receiver is aligned with the port.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
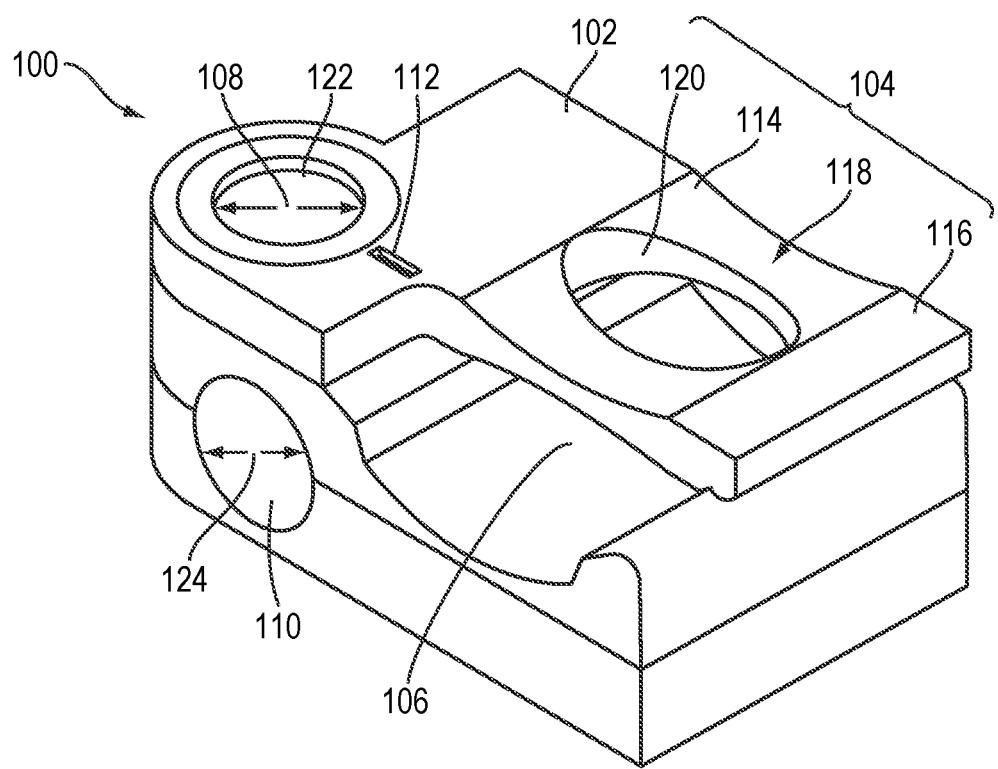
FIG. 1 illustrates an isometric view of a laser receiver in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring to FIG. 1, a laser receiving apparatus 100 is illustrated in accordance with various embodiments. According to the illustrated embodiment, the laser receiving apparatus 100 includes a body 102, a tab 104 and a cavity 106. The body 102 includes a first port 108, a second port 110 and a measurement mark 112. In the illustrated embodiment, the tab 104 includes a proximate end 114, a distal end 116, a central region 118 and an opening 120. A laser receiver 122 is located in the first port and a level is located in the second port 124. In various embodiments, an electronic system (see FIG. 4) is located in a compartment formed within the body 102.

In general, the laser receiving apparatus 100 operates to provide audio, visual and/or other forms of notification to a user when a beam projected from a laser strikes the laser receiver 122. As described in greater detail below, the laser receiving apparatus 100 can receive a flexible tape measure within the cavity 106 in a sliding engagement. As a result, a user can easily move the laser receiving apparatus 100 along the surface of the tape to record measurements made relative to the reference provided by the laser.

According to various embodiments, the body 102 and the tab 104 are manufactured from ABS, PVC, another type of plastic or other suitable material. In general, the body 102 and the tab 104 are manufactured from a lightweight material with sufficient strength to withstand being accidentally dropped or kicked when in use on a jobsite. The manufacturing process can include injection molding, 3D printing, machining or other approaches depending on the embodiment. In one embodiment, the body 102 includes a top half and a bottom half that are manufactured as two separate pieces that are attached to one another during assembly of the laser receiving apparatus. According to a further embodiment, the top half of the body and the tab are manufactured as a single integral piece.

The proximate end 114 of the tab 104 is attached at the body 102. The central region 118 of the tab 104 extends from the body to the distal end 116 of the tab 104. According to the illustrated embodiment, the opening 120 has an elliptical shape and is centrally located in the central region 118 of the tab 104.

The first port 108 provides an opening or recess in a top surface of the body 102. The first port receives the laser receiver 122 which is included in an electronic system located in the body 102. The second port provides an opening or recess in a front side surface of the body 102. A spirit or bubble level is located in the second port 124 to assist the user in taking precise measurements.

The measurement mark 112 is located on the top surface of the body 102 centrally aligned with the laser receiver 122 when the receiver is located in the first port 108. As explained in greater detail below, the measurement mark 112 provides the user with a reference that identifies a location of the measurement value on the tape measure with the laser receiving apparatus 100 at the current position along the tape. The measurement mark is illustrated as a slot in the top surface of the body 102 in FIG. 1. In this embodiment, the slot receives a small drop of paint in a color easily seen by the user to form the measurement mark 112. In other embodiments, the measurement mark can be recessed/engraved or raised above the top surface. In any of these embodiments, the measurement mark 112 can be provided in a high visibility color. Various other forms of indicia can be used, for example, arrows, a small circle, a raised dot or other shapes, symbols or characters can be employed provided they can be seen by the user.

Figure 2A:
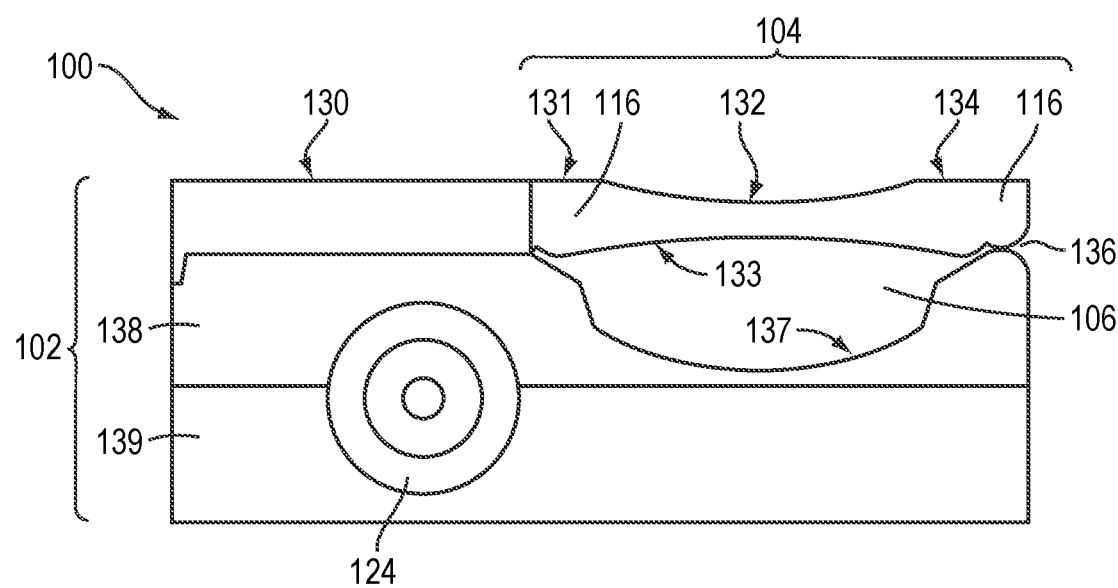
FIG. 2A illustrates a plan view of the front side of the laser receiver of FIG. 1 in accordance with one embodiment.

Referring now to FIG. 2A a plan view of the front side of the laser receiving apparatus 100 is illustrated in accordance with one embodiment. FIG. 2A illustrates a linear opening 136 located on an underside of the distal end 116 of the tab 104. The linear opening 136 allows the tape measure to be slid into the cavity 106 formed within the laser receiving apparatus 100. According to the illustrated embodiment, the body 102 includes a top half 138 and a bottom half 139 that are secured together during manufacturing. An internal compartment or cavity can be formed when the top half 138 and the bottom half 139 are assembled. According to some embodiments, the internal compartment is sized and configured to house an electronic system, see FIG. 4. This construction provides a closed compartment except for the first port 108 which allows the laser receiver 122 to connect to other elements included in the electronic system located in the compartment. The body 102 can also include a removable panel to provide access to batteries employed with the electronic system.

The body 102 includes a planar top surface 130. The proximate end 114 of the tab 104 includes a planar top surface 131. The central region 118 includes an arcuate-shaped top surface 132. The distal end 116 of the tab 104 includes a planar top surface 134. A lower surface of the cavity is defined by an upper surface of the body 102. According to the illustrated embodiment, the upper surface of the body 102 includes a surface 137 that defines the bottom of the cavity 106. The tab 104 includes a bottom surface 133 that is slightly curved. FIG. 2A also illustrates the bubble level 124 located in the second port 110.

Figure 2B:
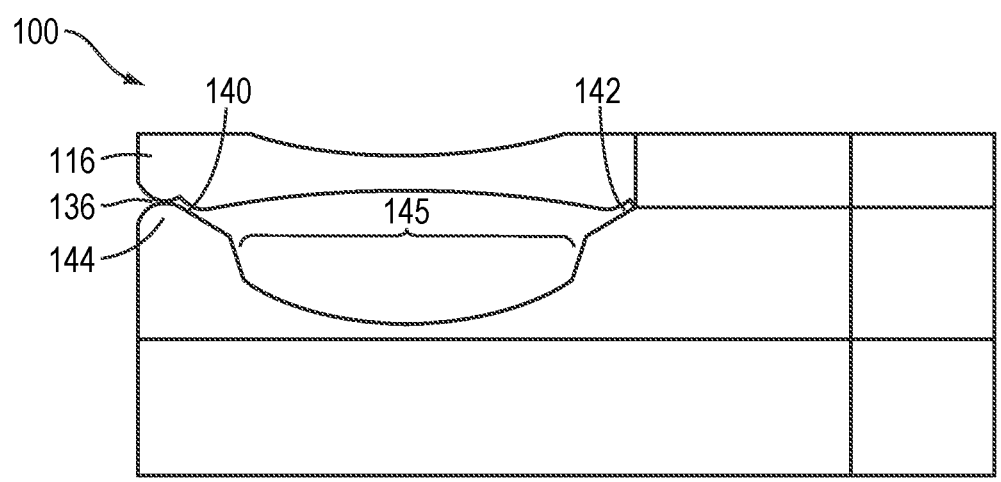
FIG. 2B illustrates a plan view of the rear side of the laser receiver of FIG. 1 in accordance with one embodiment.

Referring now to FIG. 2B, a plan view of the rear side of the laser receiving apparatus 100 is illustrated in accordance with one embodiment. In operation with a tape measure received within the cavity 106, the rear side faces the housing of the tape measure and the front side faces toward the distal end of the tape that is withdrawn from the housing of the tape measure. While the flexible tapes included in tape measures generally have the same overall form (an upward curving sweep), the specific features and dimensions are not uniform. FIG. 2B illustrates various features of the laser receiving apparatus 100 that allow the apparatus to receive a flexible measuring tape in the cavity 106 while maintaining a suitable degree of friction between the interior walls of the cavity 106 and the tape. That is, the laser receiving apparatus 100 must grip the measuring tape with enough force such that the apparatus will not immediately slide downward if released by the user when attached to a tape being held in a vertical orientation. However, the amount of friction that holds the laser receiving apparatus 100 in place must also be small enough to allow the user to easily slide the apparatus 100 along the measuring tape.

As identified in FIG. 2B, the body 102 includes a raised edge 144 that is located beneath the distal end of the tab 104. FIG. 2B also illustrates a first gap 140 and a second gap 142 that are located on either side of the cavity 106 beneath the distal end 116 of the tab and the proximate end 114 end of the tab, respectively. These gaps 140, 142 extend axially between the bottom surface of the cavity 137 and the bottom surface 133 of the tab 104. The linear opening 136 is directly adjacent the first gap 140 above the raised edge 144. The portion of the body 102 that houses the electronic system is immediately adjacent the second gap 142 where the proximate end 114 of the tab 104 meets the body 102. A recessed central region of the cavity 145 provides a deeper region of the cavity 106. As a result, the two gaps 140, 142 extend in a wing-like manner at either side of the cavity 106.

The overall contour provided by the cavity 106 including the deeper central region 145 and the two gaps 140, 142 is configured to receive a wide variety of conventional tape measures. While most conventional tape measures include a flexible tape one inch wide, the thickness in a region of the hook (the distal end of the flexible tape) can widely vary. According to the illustrated embodiment, the deep central region 145 allows the laser receiving apparatus to receive tapes whether thick hardware or thin hardware is used to secure the hook to the tape.

According to one embodiment, the size and shape of the cavity 106 located between surfaces of the body and surfaces located on an underside of the tab 104 universally fits conventional tape measures. Further, the interior dimensions of the cavity 106 along with the shape of the interior surface provides a clamping force that properly grips conventional tape measures, universally. For example, the top and bottom surfaces of the first gap 140 and the second gap 142 grip the edges of a flexible measuring tape, respectively, with the tape received in the cavity 106. That is, the regions defined by each of the gaps 140, 142, respectively, gently squeeze the opposing sides of the measuring tape to deliver a friction fit with a limited amount of pressure with the measuring tape received in the cavity 106.

The linear opening 136 defines an opening (for example, a slit) located between an underside of the distal end 116 of the tab 104 and the raised edge 144 of the body 102. In operation, the flexible measuring tape included in the tape measure is inserted edgewise into the linear opening 136. The overall construction of the laser receiving apparatus 100 allows the tab 104 to flex slightly upward pivoting at the point of attachment with the body 102. The size of the linear opening 136 increases and the distal end 116 is raised upward as the flexible tape is forced through the linear opening 136 and into the cavity 106. With the tape fully received in the cavity 106, the linear opening 136 returns to its original dimensions. The central part of the measuring tape defined between the opposing parallel edges of the tape is received in the central region of the cavity 145. A first edge of the measuring tape is located within the first gap 140 and a second edge of the measuring tape is located within the second gap 142. The flexible nature of the tab 104 can also be used to create clamping pressure on the measuring tape in the regions of the gaps 140, 142. According to some further embodiments, the underside 133 of the tab 104 includes raised regions adjacent the gaps 142, 144. The raised regions can assist in securing the flexible tape in the cavity 106. To remove the tape from the cavity 106 the process can be reversed. That is, the tape can slide back through the linear opening 136. Here too, the flexible construction of the tab 104 allows the size of the gap 104 to slightly increase as the tape slides between the distal end 116 of the tab 104 and the raised edge 144 of the body 102 as it is withdrawn from the cavity.

Figure 3A:
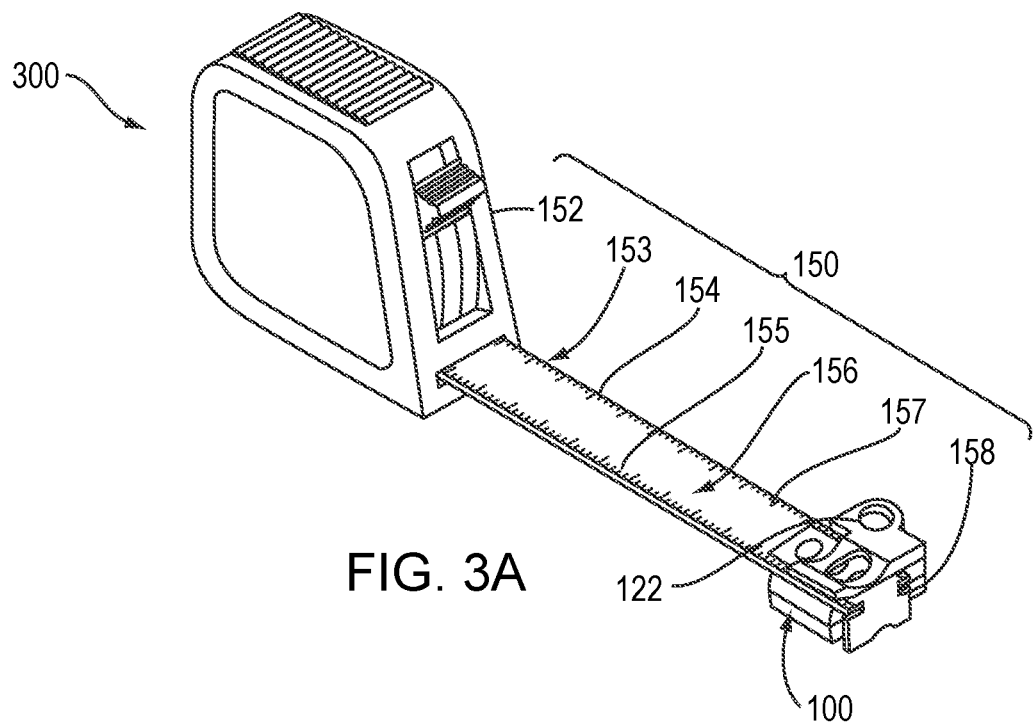
FIGS. 3A and 3B illustrate views of the laser receiver of FIG. 1 in use with a tape measure in accordance with one embodiment.
Figure 3B:
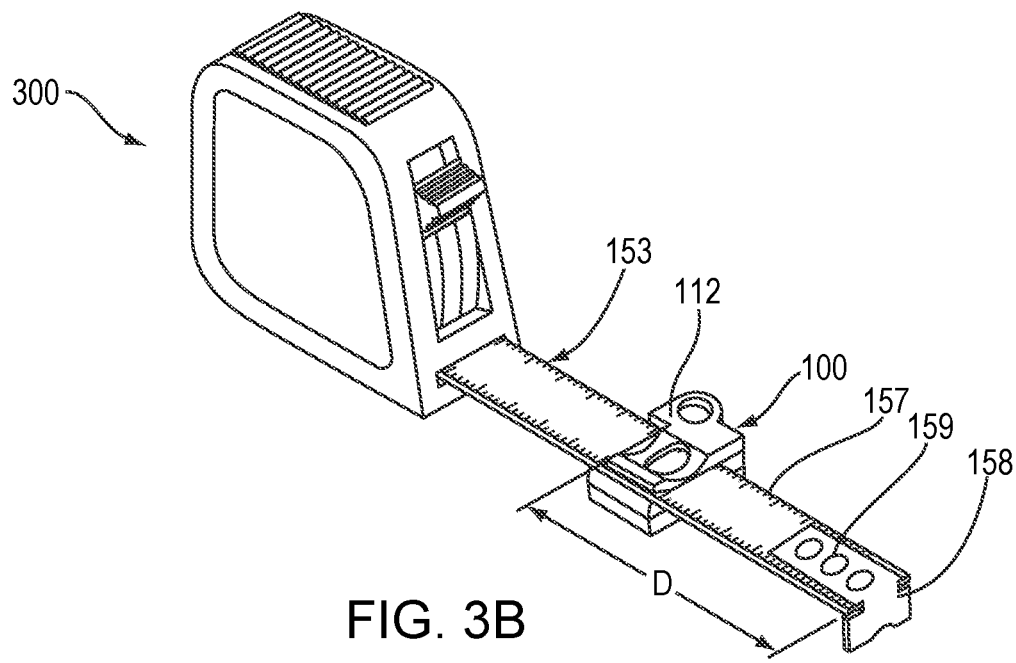

Referring now to FIGS. 3A and 3B, a measuring system 300 is illustrated in accordance with one embodiment. According to the illustrated embodiment, the measuring system includes the laser receiving apparatus 100 and a tape measure 150. The tape measure 150 includes a housing 152, a flexible tape 153, a first edge 154, a second edge 155, an upper surface 156, indicia 157 and a hook 158 located at the distal end of the tape 153. A tang 159 is used to secure the hook 158 to the distal end of the tape 153. The overall construction and operation of the tape measure 150 is known. For example, the housing 152 houses the flexible tape 153 wound around itself with the tape retracted in the housing 152. A spring located within the housing 152 provides the force to automatically retract the flexible tape 153 into the housing 152. The hook 158 stops the retraction of the tape 153 by catching on an exterior surface of the housing when the tape reaches a fully retracted position. The flexible tape 153 has a generally arcuate shape defined between the first edge 154 and the second edge 155. The top surface 156 includes indicia 157 that provide measurement reference marks. For example, the indicia 157 typically include reference marks identified by the distance between the reference mark and the distal end of the tape.

According to the illustrated embodiment, the flexible tape 153 is received in the cavity 106 of the laser receiving apparatus 100. With the apparatus 100 secured to the tape in this orientation, the laser receiver 122 faces in the same direction as the measurement indicia 157 included on the surface 156. As illustrated in FIG. 3B, the laser receiving apparatus 100 can be moved along the flexible tape 153 while maintaining the tape secured within the cavity 106.

FIG. 3A illustrates the flexible tape 153 received within the cavity 106 of the laser receiving apparatus 100 with the apparatus located at the distal end of the tape 153. To achieve the preceding position, the cavity 106 of the laser receiving apparatus 100 must be sized and configured to allow the tang 159 to be located within the cavity 106. However, the region of the tang 159 is relatively thick because it often includes fasteners used to secure the tang 159 to the flexible tape 153. Also, the tang 159 is typically a rigid piece of metal or plastic. Referring again to FIGS. 2A and 2B, the contour provided by the bottom surface 137 of the cavity 106 is sized and shaped to permit a receipt of the tang 159 while gripping the edges 154, 155 of the flexible tape within the gaps 140, 142, respectively.

In operation, a user can place the hook against a surface or hooked over structure and move the laser receiving apparatus 100 along the flexible tape 153 until the laser detector 122 is aligned with a laser beam being projected at the jobsite. Feedback provided by the laser receiving apparatus 100 alerts the user that the apparatus is properly aligned with the laser such that a measurement can be taken. Here, the user refers to the measurement mark 112 to identify the indicia 157 that provides a measurement between the hook 158 and the measurement mark 112. In FIG. 3B, this is referred to as the distance D. This process can be repeated as needed to layout the measurements for the job.

Figure 4:
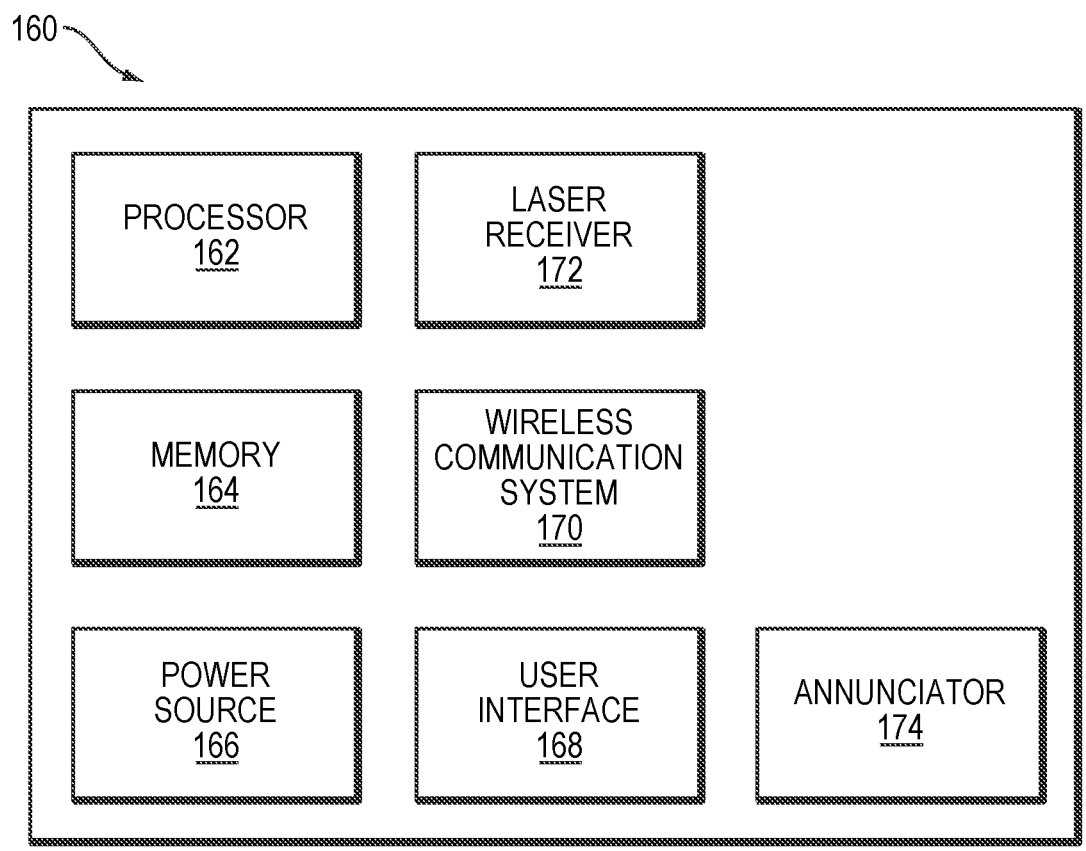
FIG. 4 illustrates a system level block diagram of an electronic system included in the laser receiver of FIG. 1 according to one embodiment.

Referring now to FIG. 4, an electronic system 160 is illustrated in accordance with some embodiments. In the illustrated embodiment, the electronic system 160 includes a processor 162, a memory 164, a power source 166, a user interface 168, a wireless communication system 170, a laser receiver 172 and an annunciator 174.

The electronic system 160 includes one or more communication buses (not shown) to connect the various components included in the system 160 to the processor 162, the memory 164 and/or one another as required by the application. The communication buses can be used for the communication of instructions/commands and data between the illustrated components and between the illustrated components and other components included in the device depending on the embodiment.

The processor can include a microcontroller or another component configured to process instructions provided by firmware, software or other programs stored in the memory 164. The execution of the program code operates to receive inputs and generate outputs that provide the functionality of the laser receiving apparatus 100.

The memory 164 is configured to store software instructions in accordance with various embodiments. In one embodiment, the memory 164 is included in the processor 162. In another embodiment, the memory 164 includes both memory internal to the processor 162 and memory external to the processor 162. In various embodiments, the memory 164 can include non-volatile memory, for example, EEPROM.

To reduce parts count and costs, the processor 162 and the memory 164 are not included in some embodiments. In these embodiments, the electronic circuitry provide by the system 160 operates to provide laser detection and annunciation in the manner described below using circuitry with a set of discrete electronic components such as amplifiers, transistors, and diodes in combination with other components described herein.

Depending on the embodiment, the power source 166 can include one or more batteries, for example, lithium or alkaline batteries. According to one embodiment, coin cell batteries are included in the power source 166. Further, the power source 166 can include a replaceable power source or a rechargeable power source depending on the embodiment. According to some embodiments, the electronic system 160 includes an external connection, for example, a USB port used to connect power to a rechargeable power source included in the laser receiving apparatus 100.

The user interface 168 can vary depending on the embodiment. According to some embodiments, the user interface 168 is an optional element of the electronic system 160. According to one embodiment, the user interface 168 includes one or more indicating lights (for example, LEDs) to provide information concerning the operational status of the electronic system 160, for example, on/off, battery status, operational status of the laser receiver 172 and the status of wireless communication system 170 (i.e., whether the electronic system 160 successfully paired with a corresponding portable electronic device). In various embodiments, the user interface 168 includes an on/off switch, for example, a toggle switch, a rocker switch, a push button switch. In one embodiment, the push button is employed in a press-and-hold on/off operation.

According to one embodiment, the wireless communication system 170 provides for local wireless communication via BLUETOOTH wireless communication protocol. According to some embodiments, the wireless communication system 170 is an optional element of the electronic system 160. According to one embodiment, the communication system 170 provides BLUETOOTH communication suitable for transmission of information between the laser receiving apparatus 100 and a portable electronic device (for example, a mobile phone, tablet, etc.) located proximate to the device. According to this embodiment, a user can employ the laser receiving apparatus 100 in combination with a mobile phone or tablet to store location information, measurement data and/or system status for one or more sessions in which the laser receiving apparatus 100 is employed. In some further embodiments, the electronic system 160 supports hardwired communication, for example, communication via USB or other hardwired communication port included in the laser receiving apparatus 100.

In general, the laser receiver 172 operates as an optical sensor with dynamic electrical characteristics that change based on the light received by the device. Depending on the embodiment, the laser receiver 172 can include a photodiode and/or a photoresistor. These devices generally include one or more of optical filters, a lens and a surface area which is positioned to receive light, for example, the laser beam. According to one embodiment, the laser receiver 172 includes a photodiode array. Referring again to FIG. 1, the laser receiver 122 is located in the first port 108 with the surface area and lens visible from an exterior of the laser receiving apparatus 100. Where a photoresistor is used, the photoresistor operates to change resistance in response to a receipt of light on the surface area. Where a photodiode is used, the photodiode switches operating modes in response to a receipt of light on the surface area. Depending on the embodiment, the laser receiver responds to lasers projected in a red wavelength, lasers projected in a green wavelength or both red and green wavelengths. According to some further embodiments, the laser receiver operates to detect laser beams emitted in a pulsed mode and laser beams emitted in a continuous mode.

In general, the annunciator 174 operates to notify the user when the laser receiver 172 is aligned with a laser beam projected from a cross line, rotary or another type of laser operating on the jobsite. In particular, the annunciator 174 can provide audible feedback, visual feedback or a combination of audible and visual feedback to the user when the laser receiver 172 detects the projected laser beam. Accordingly, the annunciator 174 can include one or more speakers and one or more indicating lamps. According to another embodiment, the annunciator includes tactile also referred to as "haptic" feedback either alone or in combination with audio and/or visual feedback. For example, in some embodiments, the annunciator includes a vibration motor that operates to produce a vibration felt in the hand of the user when the laser receiver 172 detects the projected laser beam. Both visual and tactile feedback are useful on a noisy jobsite where ambient noise makes it difficult to hear. For example, either or both of visual feedback and tactile feedback can assist where the user is wearing hearing protection.

The way the projected beam is detected along with the associated feedback can also vary depending on the embodiment. For example, where the laser receiver 122 operates in one of two states (beam detected and no beam detected) the annunciator 174 operates in one of two states according to some embodiments. First, where no beam is detected the annunciator 174 may not operate to provide any feedback. Where the annunciator 174 includes speakers, they may not project any sound when a beam is not detected. Similarly, where the annunciator 174 includes an indicator lamp such as an LED, the lamp may remain unilluminated when a beam is not detected. And where the annunciator 174 includes haptic feedback, the haptic system may not produce any vibration when a beam is not detected. In further embodiments where the laser receiver 122 operates in one of two states (beam detected and no beam detected), the annunciator 174 may provide two forms of active notification. For example, the annunciator 174 may provide a first audible sound when a beam is not detected and a second audible sound different than the first when a beam is detected. Similarly, where the annunciator 174 includes an indicator lamp, the annunciator 174 may provide a first illumination pattern when a beam is not detected and a second illumination pattern different than the first when a beam is detected. Further where the annunciator 174 includes haptic feedback, the haptic system may produce a first vibration pattern when a beam is not detected and a second vibration pattern different than the first when a beam is detected.

According to other embodiments, the laser receiver 122 operates to determine a degree of alignment between the beam and the laser receiving apparatus 100. According to these embodiments, the annunciator 174 operates in a plurality of different states to communicate the degree of alignment to the user. For example, an intermittent audio pattern can indicate a partial alignment where a solid audio pattern indicates a full alignment between the beam and the laser receiver 122.

In practice, the pulsing frequency employed with laser transmitters can vary, for example, depending on the manufacturer and/or model of the laser transmitter. According to some embodiments, the memory 164 includes one or more programs that when executed by the processor perform signal processing algorithms configured to accurately detect laser projected at any of a plurality of pulsing frequencies.

Figure 5:
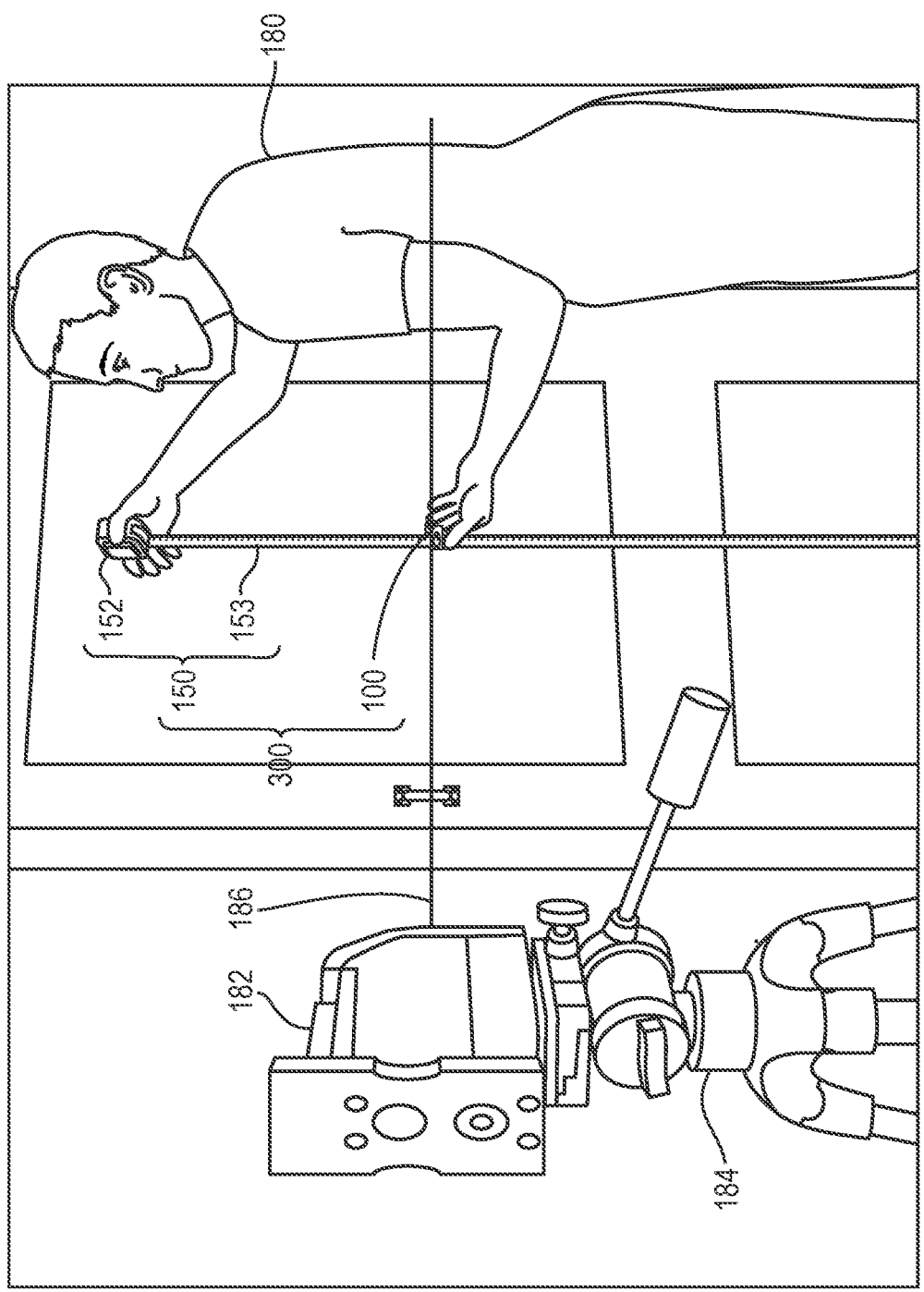
FIG. 5 illustrates the laser receiver of FIG. 1 in use in accordance with one embodiment.

Referring now to FIG. 5, the measuring system 300 is illustrated when in use. FIG. 5 illustrates a user 180, a laser source 182, a tripod 184 and a laser beam 186. The laser source 182 is mounted on the tripod 184 at an elevation and location set by the user 180. The elevation of the laser source 182 sets an elevation of the laser beam 186 projected from the source 182. The adjustable nature of the tripod 184 allows the user 180 precisely locate the elevation of the laser beam 186. With the elevation set, the user employs the tape measure 150 in combination with the laser receiving apparatus 100. The flexible tape 153 is received within the cavity of the apparatus 100 in a friction fit. That is, the edges 154, 155 of the flexible tape 153 are gripped within the respective gaps 140, 142 while the arcuate-shaped central region of the tape 153 is received within the deeper central region 145 of the cavity 106. In this configuration, the user 180 is free to slide the laser receiving apparatus 100 up and down the flexible tape 153 until the laser receiver 122 is aligned with the laser beam 186. The laser receiving apparatus 100 alerts the user 180 that the apparatus and beam are aligned. The user 180 can then refer to the measurement mark 112 to identify the measurement displayed at that location on the flexible tape 153, i.e., referring to the measurement indicia 157. As is seen in FIG. 5, the overall configuration and form factor of the laser receiving apparatus 100 allow the unit to be easily removed from the flexible tape 153 and placed in the user's 180 pocket. From there it can be easily retrieved and used to record any number of additional measurements with precise reference to the laser beam 186.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus configured to employ with a retractable tape measure including a flexible measuring tape having a first edge and a second edge that is parallel to the first edge, the apparatus comprising:
   an electronic system including a laser receiver configured to detect a laser projected in at least one of a red wavelength and a green wavelength; and
   a body configured to house the electronic system therein, the body including an arcuate-shaped cavity configured to receive the flexible measuring tape in a sliding engagement, and a top surface oriented to face in a direction from which the flexible measuring tape is read with the flexible measuring tape received in the cavity, wherein the top surface includes a port configured to align with the laser receiver.

2. The apparatus of claim 1, further comprising a tab including a proximate end secured to the body, a distal end, and an underside that extends from the proximate end to the distal end, the underside facing the cavity.

3. The apparatus of claim 2, further comprising:
   a first gap located adjacent the body beneath the proximate end of the tab; and
   a second gap located beneath the distal end of the tab, wherein the first gap is sized and configured to maintain a friction fit with the first edge of the flexible measuring tape with the flexible measuring tape received in the cavity, and
   wherein the second gap is sized and configured to maintain a friction fit with the second edge of the flexible measuring tape with the flexible measuring tape received in the cavity and the first edge received in the first gap in the friction fit.

4. The apparatus of claim 3, wherein a first raised region is formed in the underside at the proximate end, and
   wherein the first raised region in combination with the body define a size of the first gap.

5. The apparatus of claim 4, wherein a second raised region is formed in the underside at the distal end,
   wherein the body includes a raised edge located adjacent the distal end of the tab, and
   wherein the raised edge in combination with the second raised region define a size of the second gap.

6. The apparatus of claim 2, wherein the tab is secured to the body such that the distal end of the tab can be flexed upward from an at rest position.

7. The apparatus of claim 6, wherein the body includes a bottom half,
   wherein a linear opening is defined between the distal end and the bottom half of the body, the linear opening configured to receive the flexible measuring tape edgewise, and
   wherein a height of the linear opening is increased with the distal end of the tab flexed upward.

8. The apparatus of claim 1, wherein the laser receiver is configured to detect the laser projected in the red wavelength, and
   wherein the laser receiver is configured to detect the laser projected in the green wavelength.

9. The apparatus of claim 1, wherein the laser receiver includes a photodiode array.

10. The apparatus of claim 1, wherein the electronic system includes an annunciator configured to provide feedback concerning a detection of the laser by the laser receiver, the feedback including at least one of audio feedback, visual feedback and haptic feedback.

11. A measuring system comprising the apparatus of claim 1 and a retractable measuring tape.

12. A method of employing a flexible measuring tape with a laser level, the flexible measuring tape including a first edge and a second edge that is parallel to the first edge, the method comprising:
   providing an apparatus including a body and an electronic system having a laser receiver configured to detect a laser projected in at least one of a red wavelength and a green wavelength, the apparatus provided in a handheld pocket-size form factor;

configuring the body to include each of: an arcuate-shaped cavity configured to receive the flexible measuring tape in a sliding engagement; a top surface oriented to face in a direction from which the flexible measuring tape is read with the flexible measuring tape received in the cavity; and a port formed in the top surface; and locating the electronic apparatus within the body such that the laser receiver is aligned with the port.

13. The method of claim 12, further comprising including a tab in the apparatus, the tab having a proximate end secured to the body, a distal end, and an underside that extends from the proximate end to the distal end, the underside facing the cavity.

14. The method of claim 13, further comprising:
including a first gap located adjacent the body beneath the proximate end of the tab; and
including a second gap located beneath the distal end of the tab;
configuring the first gap with a size and a shape to maintain a friction fit with the first edge of the flexible measuring tape with the flexible measuring tape received in the cavity; and
configuring the second gap with a size and a shape to maintain a friction fit with the second edge of the flexible measuring tape with the flexible measuring tape received in the cavity and the first edge received in the first gap in the friction fit.

15. The method of claim 14, further comprising forming a first raised region in the underside at the proximate end, the first raised region in combination with the body defining a size of the first gap.

16. The method of claim 15, further comprising:
forming a second raised region in the underside at the distal end; and
including, in the body, a raised edge located adjacent the distal end of the tab, and
wherein the raised edge in combination with the second raised region define a size of the second gap.

17. The method of claim 13, further comprising securing the tab to the body to permit the distal end of the tab to be flexed upward from an at rest position.

18. The method of claim 17, wherein the body includes a bottom half, and wherein the method further comprises defining a linear opening between the distal end and the bottom half of the body, the linear opening configured to receive the flexible measuring tape edgewise, a height of the linear opening increasing with the distal end of the tab flexed upward.

* * * * *